(12) United States Patent
Quinn et al.

(10) Patent No.: US 11,036,537 B1
(45) Date of Patent: Jun. 15, 2021

(54) ON DEMAND CAPACITY MANAGEMENT IN PROVIDER NETWORKS USING TYPE-AGNOSTIC RESOURCES

(71) Applicant: Amazon Technologies, Inc., Seattle, WA (US)

(72) Inventors: Michael Phillip Quinn, Seattle, WA (US); Nishant Mehta, Snoqualmie, WA (US); Diwakar Gupta, Seattle, WA (US); Bradley Joseph Gussin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/365,563

(22) Filed: Mar. 26, 2019

(51) Int. Cl.
*G06F 9/455* (2018.01)
*G06F 9/50* (2006.01)

(52) U.S. Cl.
CPC ........ *G06F 9/45558* (2013.01); *G06F 9/5005* (2013.01); *G06F 9/5044* (2013.01); *G06F 9/45533* (2013.01); *G06F 9/5027* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 9,116,803 B1* | 8/2015 | Agrawal | G06F 9/45558 |
| 9,465,639 B2* | 10/2016 | Chen | G06F 9/45558 |
| 10,303,500 B2* | 5/2019 | Chen | G06F 9/45533 |
| 2008/0189700 A1* | 8/2008 | Schmidt | G06F 11/203 718/1 |
| 2009/0210527 A1* | 8/2009 | Kawato | G06F 9/45558 709/224 |
| 2009/0327459 A1* | 12/2009 | Yoo | H04L 45/22 709/221 |
| 2011/0265069 A1* | 10/2011 | Fee | G06F 8/41 717/151 |
| 2013/0219066 A1* | 8/2013 | Arroyo | G06F 9/5077 709/226 |
| 2013/0262682 A1* | 10/2013 | Olsen | H04L 67/1031 709/226 |
| 2014/0006621 A1* | 1/2014 | Sims | G06F 9/5016 709/226 |

(Continued)

OTHER PUBLICATIONS

Diaz et al, Optimal allocation of virtual machines in multi-cloud environments with reserved and on-demand pricing, 2017, Elsevier, Future Generation Computer Systems 71, pp. 129-144 (Year: 2017).*

(Continued)

*Primary Examiner* — Abu Zar Ghaffari
(74) *Attorney, Agent, or Firm* — Nicholson De Vos Webster & Elliott LLP

(57) ABSTRACT

Techniques for on demand capacity management in a provider network are described. The provider network includes electronic devices that provide computing-related resources to customers. The unused capacity of these electronic devices—such as processor cores, memory, network bandwidth, etc.—can be used to satisfy a variety of computing needs. Services of the provider network allocate portions of the unused capacity based on customer requests for computing-related resources.

20 Claims, 8 Drawing Sheets

(56) References Cited

U.S. PATENT DOCUMENTS

| | | | | |
|---|---|---|---|---|
| 2014/0040893 A1* | 2/2014 | Karve | ............... | G06F 9/45545 |
| | | | | 718/1 |
| 2014/0089510 A1* | 3/2014 | Hao | ................ | G06F 9/5072 |
| | | | | 709/226 |
| 2014/0115168 A1* | 4/2014 | Yamashima | ........ | G06F 9/5083 |
| | | | | 709/226 |
| 2015/0106805 A1* | 4/2015 | Melander | ............ | G06F 9/5072 |
| | | | | 718/1 |
| 2015/0324215 A1* | 11/2015 | Borthakur | ......... | H04L 43/0876 |
| | | | | 718/1 |
| 2015/0355926 A1* | 12/2015 | Cropper | ............. | G06F 9/5077 |
| | | | | 718/1 |
| 2016/0314011 A1* | 10/2016 | Dow | ................. | G06N 20/00 |
| 2017/0026309 A1* | 1/2017 | Vicaire | ............... | G06F 9/5061 |
| 2019/0018698 A1* | 1/2019 | Wang | ............... | G06F 9/45558 |

OTHER PUBLICATIONS

Li et al, Elasticity-aware Virtual Machine placement for Cloud data centers, 2013, IEEE, International conference on Cloud networkign pp. 99-107 (Year: 2013).*

\* cited by examiner

US 11,036,537 B1

ON DEMAND CAPACITY MANAGEMENT IN PROVIDER NETWORKS USING TYPE-AGNOSTIC RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following drawings.

DETAILED DESCRIPTION

Figure 1:
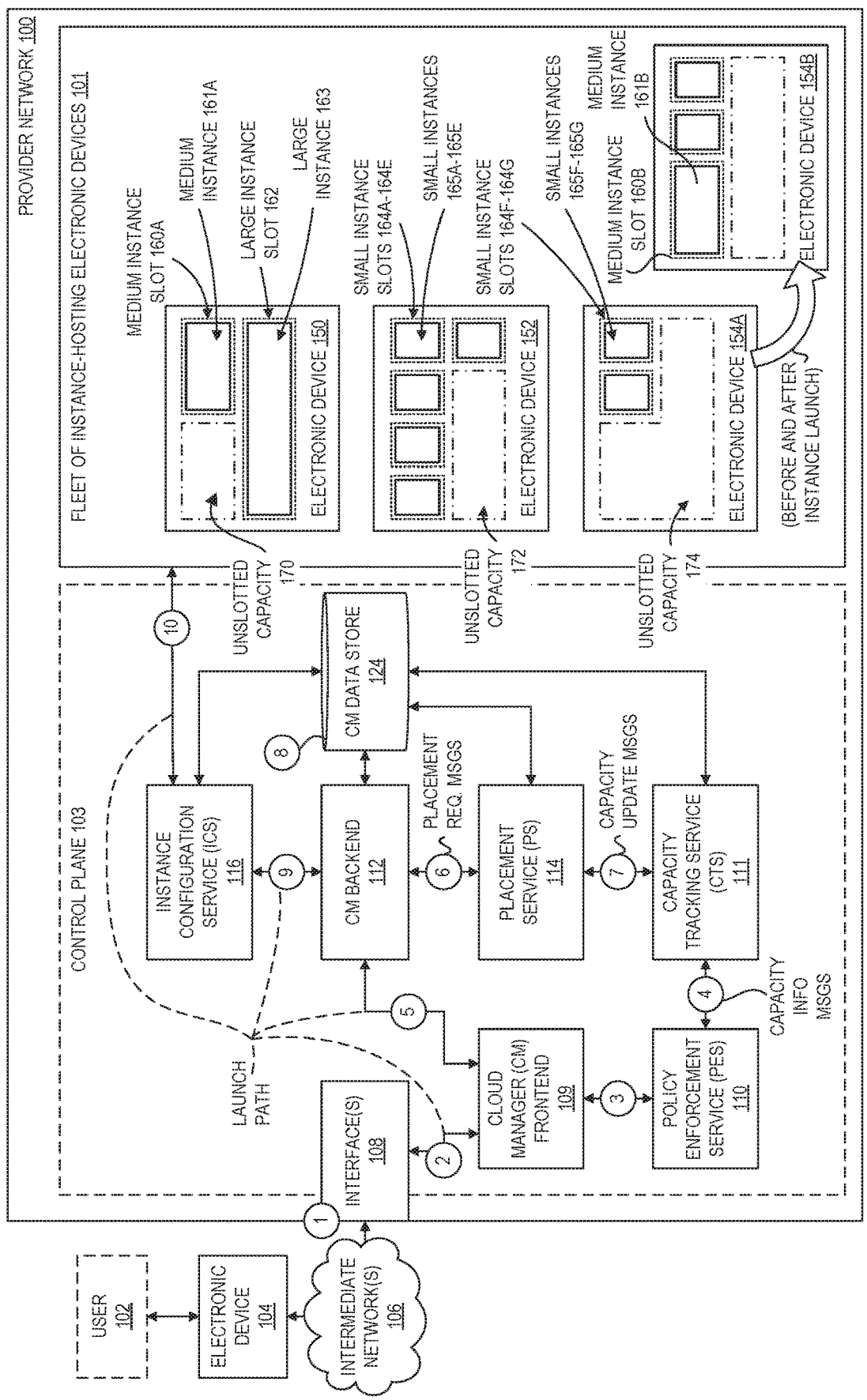
FIG. 1 is a diagram illustrating an environment for on demand capacity management in a provider network according to some embodiments.

Various embodiments of methods, apparatus, systems, and non-transitory computer-readable storage media for on demand capacity management are described. Providers of virtualization technologies and other services often maintain fleets of computer systems and other equipment that form the infrastructure (e.g., physical computer systems, networking systems, storage systems) on which to host virtualized computing resources and other services. In order to manage such infrastructure, some providers have grouped the physical computing resources based on their ability to support certain types of virtualized compute environments. For example, the provider may have a first pool of one hundred computer systems that support "small" type virtualized compute environments and a second pool of one hundred computer systems that support "large" type virtualized compute environments. The term "instance" may be used to encompass these virtualized compute environments and other compute resources. Each computer system in the first pool might support sixteen small type instances (i.e., 1,600 small environments) and each computer system in the second pool might support four large type instances (i.e., 400 large environments). The provider separately tracks usage between these pools by logically dividing up the computer system into "slots" that represent portions of the capacity of computer systems that can support the small or large virtualized compute environments. Thus, a computer system in the first pool would have sixteen small slots, and a computer system in the second pool would have four large slots. The provider can launch customer instances on computer systems thereby "using up" the associated logical divisions. Although the terms large and small connote size, instance types may vary along many dimensions other than "size," such as compute (e.g., number of processor cores or virtual central processing units), memory (e.g., amount of memory), storage (e.g., whether there is locally attached, rather than network-attached, storage, and an amount of it available to the customer), network (e.g., how many logical network interfaces are available, how much bandwidth the customer can use), other features (e.g., local accelerators, reprogrammable hardware), and the like. Customers request an instance—be it large, small, or some other type—and the provider allocates a slot that supports the requested instance to the customer and launches the customer's instance on the associated computer system.

As the number of instance types grows and each of those instance types is supported by a fixed pool of computer systems, the provider is faced with significant challenges in infrastructure management. Such challenges include maintaining the many different pools of hardware to support the various instance types and efficiently using the hardware in view of varying levels of demand. Further, when capacity management is contingent on customer-facing instance types, the provider is forced to manage a logical pool for any kind of resource variation and install a new pool with the introduction of a new instance type or family of related instances (e.g., instances that include accelerator support with varying amounts memory). As a result, the provider's end-to-end capacity management requires forecasting, ordering, provisioning, and deploying separate pools of hardware for each instance type (or families of related instance types), increasing the overall cost of managing the network.

In addition to creating infrastructure management challenges, a fixed relationship between pools and instance types gives rise to several network operations challenges. Fixed relationships between pools of hardware and instance types can lead to disparities in pool utilization and the inability to meet customer demand. For example, if one pool is exhausted while another has a large amount of availability, customers may be unable to launch instances in the exhausted pool while the provider absorbs the cost of maintaining the low-usage pool.

Even if some infrastructure may support more than one instance type, the provider's ability to adapt to changing demand is limited by delays associated with taking one or more computer systems out of a low-demand pool, reconfiguring one or more aspects of the network (e.g., management services, the computer systems, etc.) to add those computer systems to a high-demand pool, and adding the computer systems into a high-demand pool. Given these delays, which may last minutes to hours, the provider must build and maintain systems and services to monitor and forecast future demand and attempt to reconfigure infrastructure in advance. These systems and services introduce additional complexity and expense which can still require human intervention given the limits of forecasting, resulting in a high-cost of operations.

To address these and other problems, aspects of the present disclosure decouple at least portions of the underlying hardware infrastructure from the pools of capacity associated with particular instance types. Such portions of the hardware infrastructure may be referred to as "unslotted" or type-agnostic. Rather than being pre-slotted and associated with a particular pool for an instance or instance family, the physical computer systems are divvied up in response to customer demand (e.g., requests for instances), which results in a dramatic reduction of the complexity of infrastructure management and operations. Since the decoupled hardware infrastructure may support multiple pools of instances, aspects of the present disclosure limit the consumption of capacity since launching an instance in one pool using decoupled hardware can reduce the capacity of one or more other pools. Further, once a portion of a type-agnostic computer system is allocated for a particular instance, the remaining capacity of that computer system hardware may no longer support or provide reduced support for pools of capacity. Thus, aspects of the present disclosure address the use of type-agnostic computer systems as candidates to host instances.

FIG. 1 is a diagram illustrating an environment for on demand capacity management in a provider network according to some embodiments. A user 102 (also referred to as a customer) operates an electronic device 104 or configures the electronic device 104 for communications with the provider network 100. The electronic device 104 communicates with the provider network 100 via one or more intermediate networks 106, such as the internet. As described above, a provider network provides users with the ability to utilize one or more of a variety of types of computing-related resources such as compute resources (e.g., executing virtual machines (VMs) and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

The provider network 100 includes a fleet of instance-hosting electronic devices 101 (also referred to as fleet 101) to support such virtualization techniques. The electronic devices in the fleet 101 can be computer systems of various configurations that differ along one or more dimensions, such as number and type of processors, type and amount of memory, connectivity of the memory to the processor(s), number and type of network interfaces, number and type of local storage devices (e.g., solid-state drives), number and type of hardware accelerators (e.g., graphics processing units), etc. In large-scale provider networks, there may be hundreds, thousands, tens of thousands, or more electronic devices, which may be located in multiple geographic locations.

Aspects of on demand capacity management are described for the provider network 100 with reference to an exemplary set of events and operations associated with the launch of a "medium" compute instance within the fleet 101 (specifically, an electronic device 154) is described with reference to encircled numbers '1' through '10' of FIG. 1. In this example, three different compute instance types—referred to as small, medium, and large—are presented, though in provider networks 100 there may be significantly more or even fewer types of compute instance types utilized that vary along one or more configuration dimensions.

The exemplary state of the fleet 101 prior to beginning the description of the launch is now described. The fleet 101 includes, but is not limited to, electronics devices 150, 152, and 154 (shown before and after a launch as 154A and 154B). In contrast to pre-slotted hardware infrastructure, electronic devices 150, 152, and 154 are unslotted in that their unused capacity is not pre-allocated for any particular instance type. Prior to any operations associated with the medium launch, the state of the electronic devices 150, 152, and 154A is as follows: electronic device 150 is hosting a medium instance 161A in a medium instance slot 160A and a large instance 163 in a large instance slot 162 with unslotted capacity 170; electronic device 152 is hosting small instances 165A-165E in small instance slots 164A-164E with unslotted capacity 172, and electronic device 154A is hosting small instances 165F-165G in small instance slots 164F-164G with unslotted capacity 174. Unslotted capacity 170 can support up to one medium or two small instances. Unslotted capacity 172 can support up to one medium and one small or three small instances. Unslotted capacity 174 can support a number of different combinations of instances (e.g., up to one large and one medium, one large and two small, three medium, two medium and two small, one medium and four small, or six small instances). Note that the fleet 101 may include a combination of slotted and unslotted instance-hosted electronic devices. Further note that slots 160, 162, and 164, illustrated within the electronic devices 150, 152, and 154A may be logical representations of portions of capacity managed by a control plane 103 of the provider network 100. The electronic devices 150, 152, and 154A may have no local concept of a slot and execute instances based on received configuration and launch instructions, as described below.

At circle '1', the electronic device 104 sends one or more messages to the provider network 100 to request the launch of one or more instances. Communications between the electronic device 104 and the provider network 100, such as the request to launch an instance, can be routed through interface(s) 108, such as through use of application programming interface (API) calls, via a console implemented as a website or application, etc. The interface(s) 108 may be part of, or serve as a frontend to, a control plane 103 of the provider network 100 that includes "backend" services supporting and enabling the services that may be more directly offered to customers, such as services that enable the ability of customers to launch instances within the fleet 101. In addition to serving as a frontend to control plane services, the interface(s) 108 can perform operations such as verifying the identity and permissions of the user initiating a request, evaluating the request and routing it to the appropriate control plane services, etc.

In the illustrated embodiment, a "launch path" includes the interface(s) 108, a cloud manager (CM) frontend 109, a CM backend 112, and an instance configuration service (ICS) 116 (these components may form at least a portion of a hardware virtualization service, in some embodiments). Each service in the launch path receives one or messages from an upstream entity (e.g., the CM frontend 109 receives messages from the interface(s) 108, the interface(s) 108 receive messages from the electronic device 104, etc.), performs one or more operations (e.g., collecting or validating information), and sends one or more messages to a downstream entity (e.g., the CM frontend 109 sends messages to the CM backend 112). The various components of the control plane 103 may be a set of distributed services or applications that facilitate operations as described herein. Other embodiments may combine or divide one or more of the control plane services (e.g., combining the CM frontend 109 and CM backend 112, splitting out functionality of a service, etc.).

In this example, the request to launch one or more instances is a request to launch a medium instance. The one or more messages sent by the electronic device 104 may identify one or more parameters associated with each requested instance (e.g., number of CPU cores for each instance, amount of memory for each instance, etc.) or may provide an identification of an instance type for each requested instance that identifies to the control plane such one or more parameters.

In some embodiments, a customer may have leased an entire electronic device within the fleet 101. The interface(s) 108 can provide the customer with a list of options regarding instances that can be launched within the unslotted capacity of the leased electronic device. For example, if a customer has leased electronic device 154A, the interface(s) 108 can provide instance configuration options for unslotted capacity 174, as described above (e.g., one large instance and one medium instance, one large instance and two small instances, etc.). Such options may be presented or displayed to the customer as a list of choices. The customer can select one or more of the instances to launch. In some embodiments, the interface(s) 108 can provide an indication of the amount of remaining capacity based on the customer's selections. In some embodiments, the number of combinations of instances can be quite large, so the interface(s) 108 can filter available options based on the customer's existing instance configurations and workloads within the fleet 101.

In some embodiments, the provider network can offer customers the option to launch fully-custom instances since unslotted capacity is not affiliated with any given instance type pool. The customer can specify amounts of compute, memory, networking, and other performance or hardware characteristics of a desired instance, and the provider network can create and launch such an instance independent of any pre-defined instance types or sizes that also may be available.

Upon receiving the message to launch an instance, the interface(s) 108 sends one or more messages to the CM frontend 109, as indicated at circle '2'. The messages can include information identifying the customer and identifying the type or parameters of the requested instance. In some embodiments, the CM frontend 109 offloads a portion of the operations associated with managing the provider network from the CM backend 112 to reduce the workload of the CM Backend 112. In some embodiments, the CM backend 112 may be the only service able to write to the CM data store 124, which can serve as a single source of truth of the state of the provider network 100, and thus subject to a demanding workload. One such offloaded operation is verifying that the request to launch an instance can proceed along the launch path by checking with an policy enforcement service (PES) 110, as indicated at circle '3'.

The PES 110 evaluates a launch request against one or more policies to determine whether the launch can proceed. Exemplary policies include checking the requesting customer's creditworthiness, whether the customer has any limits imposed on the number of instances they can launch, and whether the request might lead to resource shortages within the fleet 101. In the latter case, the PES 110 fetches capacity information from the capacity tracker service (CTS) 111, as indicated at circle '4'. In an exemplary embodiment, the capacity information includes a number of available slots in a given pool (e.g., the number of available medium slots in the fleet 101) and a threshold at which the PES 110 should begin to limit the number of requests that are admitted, referred to here as a "safety stock watermark." The PES 110 evaluates the launch request against the capacity information and, in some cases, may reject a launch request. For example, the CTS 111 may report the fleet 101 can support one hundred medium sized instances with a safety stock watermark of one hundred, while the customer may have requested one hundred medium-sized instances. Admitting the request would deplete the available instance pool and prevent other customers from launching medium sized instances. As a result, the PES 110 may reject the request, causing the CM frontend 109 and/or interface(s) 108 to provide an indication of the reason for failure to the customer. As another example, the CTS 111 may report the fleet 101 can support 1,000 medium sized instances with a safety stock watermark of one hundred, while the customer may have requested one hundred medium-sized instances. Since the request would not deplete the available instance pool, the PES 110 allow the launch request. In this manner, the PES 110 limits the rate at which a single customer can consume capacity within a given pool as the capacity falls below the safety stock watermark. Additional information regarding the calculation of capacity information by the CTS 111 is provided below with reference to FIG. 2.

Assuming the PES 110 allowed the request, the CM frontend 109 sends one or more messages to the CM backend 112 to continue the launch process associated with the medium instance request, as indicated at circle '5'. The CM backend 112 may be responsible for updating the CM data store 124 that contains a state of the fleet 101 (e.g., which instances are on which electronic devices, the configurations of those instances, etc.). Prior to being able to satisfy the launch request and update the state of the fleet 101, the CM backend 112 must determine where within the fleet 101 to launch the requested instance. For that, the CM backend 112 sends one or more messages to the placement service (PS) 114 to obtain placement information, as indicated at circle '6'.

The PS 114 evaluates the state of the fleet 101 to determine where to launch an instance. The fleet 101 may include numerous electronic devices with unslotted capacity, but also electronic devices with pre-slotted capacity. As described in greater detail with reference to FIG. 3, the PS 114 identifies a location for the requested instance by evaluating various parameters. Such parameters may include, but are not limited to, whether an electronic device of the fleet can support the requested instance and the existing resource utilization of the electronic device. Upon making a placement determination, the PS 114 returns placement information to the CM backend 112. Such placement information can include an identifier of the electronic device within the fleet on which to launch the instance, and a slot identifier to logically track the usage of those resources within the provider network. The PS 114 also sends updated capacity usage information to the CTS 111, as indicated at circle '7', so that the CTS 111 can update its capacity information, as described below with reference to FIG. 2.

Note that in situations where a customer has requested the launch of more than one instance and that request has proceeded to the CM backend 112, the CM backend 112 may serialize placement requests to the PS 114 or the PS 114 may serialize a received batch placement request from the CM backend 112.

For the example of the medium instance request, the PS 114 may return an identifier of electronic device 154 and an identifier of slot 160B to the CM backend 112. As shown in electronic device 154A (before launch), slot 160B does not exist. As a result, upon receiving the placement information from the PS 114, the CM backend 112 checks the CM data store 124 to determine whether the returned slot exists. If not, the CM backend 112 creates the slot and associates it with the electronic device 154. In either case, the CM backend 112 updates the CM data store 124 to indicate the instance will be launched on electronic device 154, as indicated at circle '8'. Having created the slot (if necessary) and updated the CM data store 124 to indicate the instance will be launched on electronic device 154, the CM backend 112 sends one or more messages to the ICS 116 to configure and launch the instance, as indicated at circle '9'.

The ICS 116 receives the instruction from the CM backend to configure and launch an instance. The ICS 116 performs a workflow to configure and launch an instance according to one or more parameters, such as the compute, memory, network, storage, or other configuration settings. Those parameters may be received from the CM backend 112 or fetched based on one or more received identifiers that locate the parameters within the CM data store 124. The ICS 116 communicates with the electronic device of the fleet 101 designated to host the instance, as indicated at circle '10', sending one or more messages to configure and launch the instance. For example, in some embodiments the ICS 116 may cause an offload card (which may include one or more processors, a local memory, physical network interfaces, etc.) that is a part of (e.g., coupled with) an electronic device of the fleet 101 to launch the compute instances. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor. Alternatively, in some embodiments the ICS 116 may alternatively interact with a hypervisor (e.g., via a VM management server) to cause the compute instances to be launched. In either case, the ICS 116 causes the electronic device to create a virtual machine or other environment with the requested hardware configuration (e.g., with access to a local solid-state drive, with two network interfaces, access to a local graphics accelerator, four cores, and 8 gigabytes of memory) and software configuration (executing a machine image that includes a Linux or other operating system, etc.). Continuing the medium launch example, the ICS 116 launches medium instance 161B on electronic device 154B (after launch).

Note that the environment illustrated in FIG. 1 shows an exemplary configuration of a launch path and control plane services. Other launch paths and control plane service configurations are possible. For example, the CM frontend 109 may request placement information from the PS 114 and pass the obtained placement information to the CM backend 112, the CM frontend 109 and CM backend 112 can be combined, the PS 114 and CTS 111 may access read replicas of the CM data store 124 rather than the same data store that the CM backend 112 is writing to, the CM backend 112 may make placement determinations in place of the PS 114, etc.

By deferring the allocation of capacity until receipt of requests for particular instances, the provider is able to better respond to demand and increase overall fleet utilization while reducing the burden of maintaining separate pools for each instance type or family. That is, electronic devices 150, 152, and 154 support multiple instance types and thus allow the provider network to better respond to uneven levels of demand across instance types.

Figure 2:
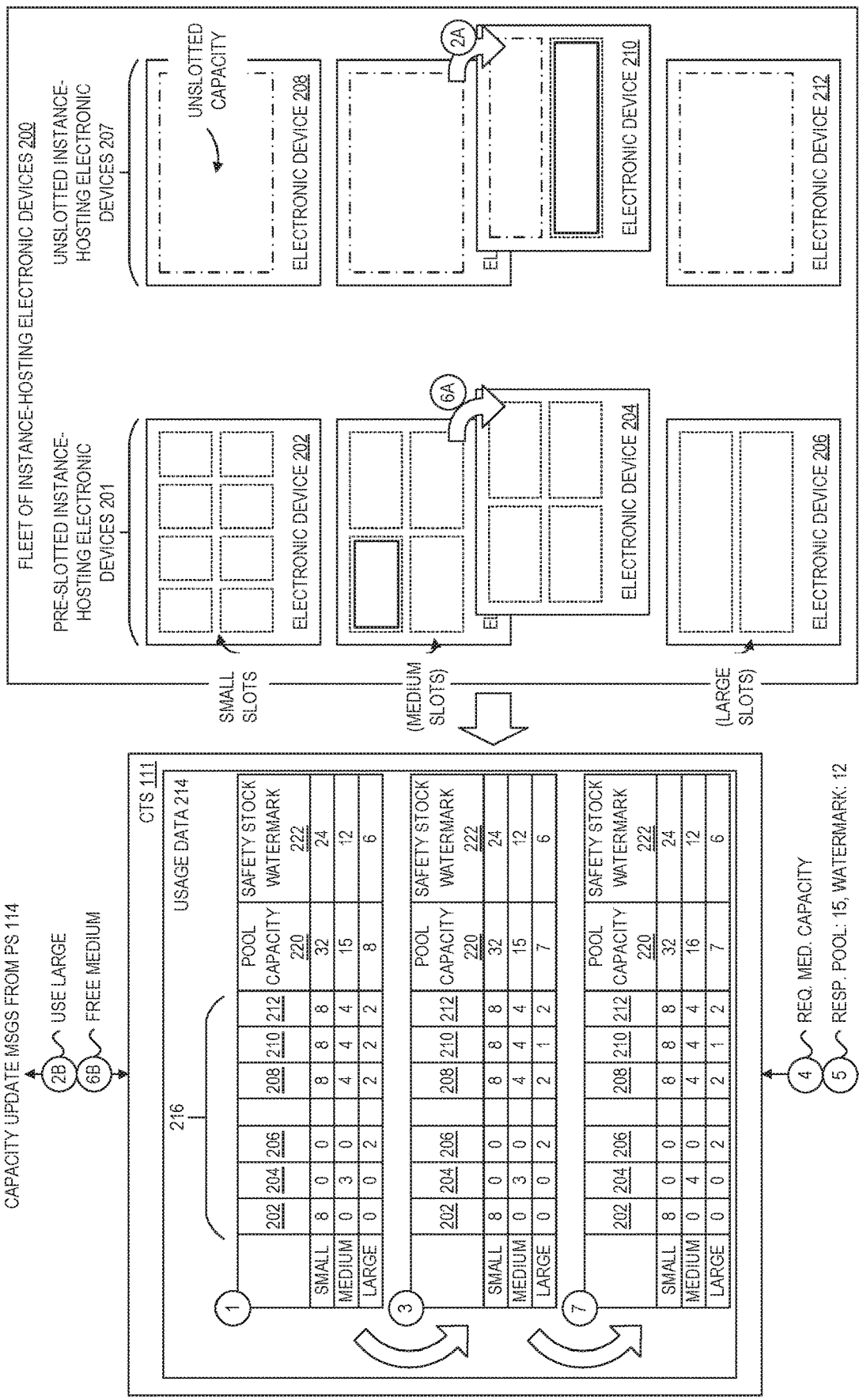
FIG. 2 is a diagram illustrating exemplary operations and messaging involving a capacity tracker service for on demand capacity management in a provider network according to some embodiments.

FIG. 2 is a diagram illustrating exemplary operations and messaging involving a capacity tracker service for on demand capacity management in a provider network according to some embodiments. As described above, one policy applied by the PES 110 attempts to address low capacity situations by regulating the rate at which customers can consume fleet resources (e.g., a single customer is prevented from exhausting all remaining fleet capacity that can support the requested instances). In one embodiment, the PES 110 applies a policy based on capacity information received from the CTS 111. Such capacity information can include, for example, an advertised number of available slots of a given instance type and a safety stock watermark that serves as an indication of when the advertised number of available slots is or is becoming constrained. An exemplary set of events and operations associated with the CTS 111 is described with reference to the encircled numbers '1' through '6' of FIG. 2.

Since unslotted capacity can support many different combinations of instances, the combined amount of capacity of separate pools can overstate the real capacity of the fleet. The CTS 111 accounts for this by adjusting the safety stock watermark to a higher level than it would otherwise be in a purely pre-slotted electronic device fleet. As shown in FIG. 2, a fleet of instance-hosting electronic devices 200 (also referred to as fleet 200) includes both pre-slotted devices 201 and unslotted devices 207 electronic devices. Pre-slotted devices 201 include electronic device 202 (with eight small slots), electronic device 204 (with four medium slots, one of which at least initially is hosting a medium instance), and electronic device 206 (with two large slots). Unslotted devices 207 include electronic devices 208, 210, and 212, each of which initially includes completely unused unslotted capacity. Again, the fleet in this example supports three different compute instance types—small, medium, and large.

The CTS 111 maintains usage data 214, which may be stored in a relational database or other data store (not shown). As illustrated, the usage data 214 includes per-device slot information 216, although in other embodiments the CTS 111 may track usage data at higher granularities (e.g., an aggregate availability for all pre-slotted devices 201 and an aggregate availability for all unslotted device 207 or a total available for all pre-slotted and unslotted devices 201, 207). As indicated at circle '1', before any changes have been made to the capacity of the fleet 200, the usage data 214 includes pool capacity 220 for each instance type. As shown, the pool capacity 220 is thirty-two for small slots, fifteen for medium slots (not sixteen since one slot of electronic device 204 is hosting an instance), and eight for large slots.

Note that this pool capacity 220, or advertised capacity, exceeds the actual amount of capacity of the fleet 200. For example, if the unslotted capacity of electronic devices 208, 210, and 212 was consumed by small instances, only two large instances could be launched (on electronic device 206) rather than the advertised eight. The CTS 111 accounts for this over-advertisement of capacity by calculating a safety stock watermark that affects the rate at which instance slots (whether slotted or unslotted) can be consumed as applied by the PES 110. In an exemplary embodiment, the CTS 111 calculates the safety stock watermark based on the total advertised capacity of a given pool and a forecasted demand for the pool. For example, the forecasted demand may call for the reservation of at least two electronic devices worth of capacity per pool. If customer requests consumed each of the small instance slots on electronic device 208, only two unslotted electronic devices would remain available to be divided between the two remaining pools (i.e., electronic device 210 and 212 for the medium and large pools). Since electronic device 204 can only support the medium pool and electronic device 206 can only support the large pool, the forecasted demand for the medium and large pools would have reached the two-device threshold. Thus, the safety stock watermark 222 for the small instance pool is set to twenty-four to allow up to eight small instances to be launched before the PES 110 begins imposing limits on the rate at which additional small instances can be launched, thereby protecting the medium and large instance pools. Similarly, the safety stock watermark 222 for the medium instance pool is calculated to be twelve, and the safety stock watermark 222 for the large instance pool is calculated to be six.

At some point the provider network may receive and process a request to launch a large instance, which the PS 114 places on electronic device 210, as shown at circle '2A'. As indicated at circle '2B,' the PS 114 sends a capacity update message to the CTS 111. If the CTS 111 tracks per-device slot information 216, the message may include specific details about the launch (e.g., which electronic device is hosting the instance). If the CTS 111 tracks usage data 214 at a larger granularity, the message may include relative adjustments (e.g., one large instance was used). In response to the receipt of capacity update data from the PS 114 at circle '2B', the CTS 111 updates usage data 214 to the state indicated at circle '3', with a reduction in the pool capacity 220 of the large instance type from eight to seven.

As indicated at circles '4' and '5', the PES 110 may check whether to permit a launch of one or more medium instances and request capacity information from the CTS 111, which at this point in time corresponds to a pool capacity 220 of fifteen with a safety stock watermark of twelve for medium instances.

Sometime later, the provider network may receive and process a request to terminate the medium instance hosted by electronic device 204, as shown at circle '6A'. As indicated at circle '6B,' the PS 114 sends a capacity update message to the CTS 111 with an indication of the freeing of a slot. In response to the receipt of capacity update data from the PS 114 at circle '6B', the CTS 111 updates usage data 214 to the state indicated at circle '7', with an increase in the pool capacity 220 of the medium instance type from fifteen to sixteen.

In some embodiments, the CTS 111 periodically reconciles its view of usage data 214 for the fleet 101 with the CM data store 124 (or a read replica of the CM data store 124).

In some embodiments, the CTS 111 can advertise other capacity information to other services of the provider network. For example, one such service might offer customers the ability to execute instances in a low priority mode such that if capacity becomes constrained, low priority instances are terminated for other, higher priority instances. The CTS 111 can advertise another watermark to the service providing low priority instances that indicates how much of the capacity of the fleet that the service can consume (e.g., an upper limit). That watermark may be based on forecasted demand for higher priority instances over the next interval of time in which it takes to terminate a low priority instance to make room for a higher priority instance. For example, if the free pool capacity is 1,000, the forecast indicates a demand of fifty instances over the next two minutes, and it takes two minutes to make fleet devices available for higher priority instances, the CTS 111 can advertise a watermark to the service providing low priority instances of 950 (the free pool capacity minus the number of instances that can be freed to satisfy demand).

Figure 3:
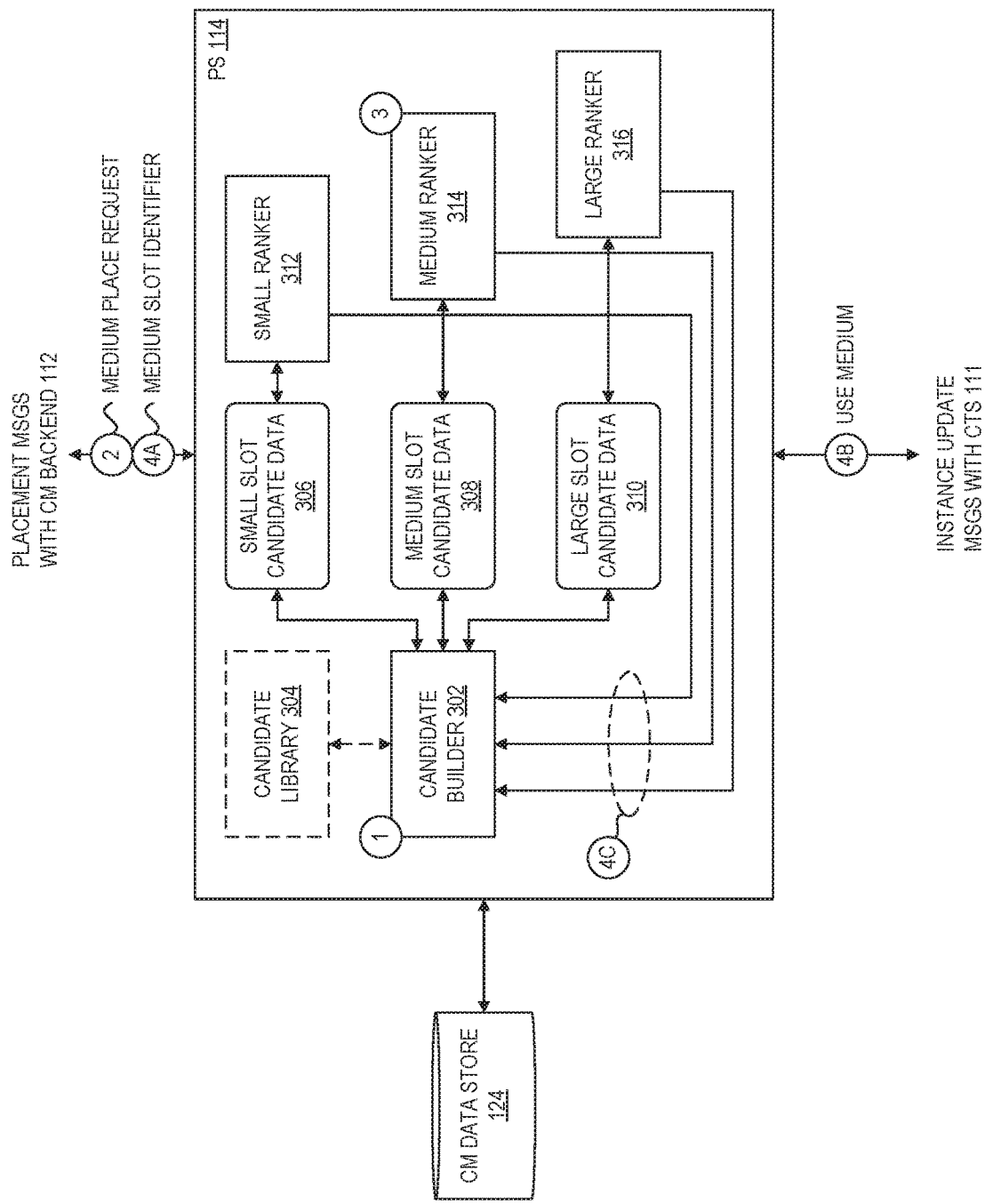
FIG. 3 is a diagram illustrating exemplary operations and messaging involving a placement service for on demand capacity management in a provider network according to some embodiments.

FIG. 3 is a diagram illustrating exemplary operations and messaging involving a placement service for on demand capacity management in a provider network according to some embodiments. At a high level, the PS 114 tracks the availability of slots to host instances and selects a slot in response to placement requests, such as those from the CM backend 112. As shown, the PS 114 includes a candidate builder 302, small ranker 312, medium ranker 314, and large ranker 316, each of which may be embodied as a set of instructions that are part of an application, service, or component, distributed or otherwise, of the PS 114. An exemplary set of events and operations associated with the PS 114 is described with reference to the encircled numbers '1' through '4' of FIG. 3.

To facilitate the selection of a slot to host an instance, the candidate builder 302 generates sets of data (e.g., a list) that identify the available slots for hosting an instance of a given type. In this example, three instance types are defined: small, medium, and large. As indicated at circle '1', the candidate builder 302 generates and maintains small slot candidate data 306, medium slot candidate data 308, and large slot candidate data 310, which the respective rankers 312, 314, 316 evaluate in response to placement requests.

As noted above, unslotted capacity can support multiple different instance types or families. In some embodiments, the candidate builder 302 accounts for unslotted capacity by creating "potential" or "possible" slots that are represented in the slot candidate data 306, 308, 310. That is, the candidate builder 302 evaluates the amount of unused, unslotted capacity on a given instance-hosting electronic device and adds one or more potential slots for each instance type that can fit within the instance-hosting electronic device to the respective set of slot candidate data. The potential slots can be combined with existing slots that come from pre-slotted instance-hosting device capacity (e.g., pre-slotted devices 201) in the slot candidate data. With reference to electronic device 212 of FIG. 2, the candidate builder can add up to eight small potential slots to the small slot candidate data 306, up to four medium potential slots to the medium slot candidate data 308, and up to two large potential slots to the large slot candidate data 310. Note that when placement requests are serialized, the candidate builder 302 may only add one potential slot of to any supported pool rather than the total number of supported slots (e.g., electronic device 212 is represented as a single potential small slot in small slot candidate data 306 rather than as eight potential small slots). In some embodiments, the slot candidate data 306, 308, and 310 may include a flag to indicate whether a slot in the data is an actual slot (in pre-slotted capacity) or a potential slot (in unslotted capacity).

In some embodiments, the candidate builder 302 identifies potential slots using what is referred to as a resource vector that identifies a set of resources in an instance-hosting electronic device. Resource vectors can be used to represent unslotted capacity as well as slots. An exemplary resource vector may represent compute and memory in a format <number of cores, amount of memory>. For example, assuming electronic device 212 has two four-core processors and 32 gigabytes (GB) of memory, the total unslotted capacity of electronic device 212 may be represented as <8, 32>. A large instance may consume four cores and 16 GB of memory (e.g., <4, 16>), a medium instance may consume two cores and 8 GB of memory (e.g., <2, 8>), and a small instance may consume one core and 4 GB of memory (e.g., <1, 4>). Note that the resource vector may extend to any number of dimensions. For example, if an instance hosting electronic device includes one accelerator and two local disks, a resource vector in the form of <number of cores, amount of memory, accelerators, disks> may be <8, 32, 1, 2>. Other components may also rely on a resource vector as a data structure to exchange or obtain information about an instance. With reference to FIG. 1, the interface(s) 108 may translate a customer request for an instance into a resource vector that is passed down or referenced by other entities in the control plane 103, for example.

To determine potential slots that can be hosted by an unslotted electronic device (or update potential slots as they are consumed), the candidate builder 302 evaluates the unused capacity resource vector of an unslotted electronic device against the resource vector that represents the instance requirements. The resource vector that represents the instance requirements may be pre-defined based on the particular instance types defined by the provider or a resource vector that the customer has customized to suit his or her needs formed by one or more parameters in the launch request. The candidate builder 302 can obtain the unused capacity resource vector from the CM data store 124 (e.g., if the CM backend 112 update an unused capacity resource vector as part of launching an instance) or calculate the unused capacity resource vector from data stored in the CM data store 124 (e.g., by subtracting the resource vector associated with each instance being hosted by an unslotted capacity device from the total capacity resource vector of the electronic device). In some embodiments, the candidate builder 302 can perform an element-wise subtraction of each resource vector that represents instance requirements from the unused capacity resource vector of an unslotted device. The candidate builder 302 can then add a potential slot to the respective candidate slot data for each instance type where the subtraction did not result in a negative value. For example, assume electronic device 152 of FIG. 1 has the 8-core, 32 GB electronic device configuration described above. The total capacity vector would be <8, 32>, and the unused capacity vector would be <3, 12> based on the consumption of five cores and 20 GB of memory by the five small instances. Subtracting the resource vector of a large instance type (e.g., <4, 16>) from the unused capacity resource vector would result in a negative value (e.g., <3, 12>−<4, 16>=<−1, −4>), so the candidate builder 302 would not add a potential slot to the large slot candidate data 310. Conversely, subtracting the resource vector of a medium instance type (e.g., <2, 8>) from the unused capacity resource vector would not result in a negative value (e.g., <3, 12>−<2, 8>=<1, 4>), so the candidate builder 302 would add a potential slot to the medium slot candidate data 308. Note that in some embodiments, to avoid the need to perform such calculations for each instance type (of which there may be many), the candidate builder 302 may perform a lookup using a candidate library 304 that returns a list of all supported instance types based on an unused capacity resource vector.

As indicated at circle '2', the PS 114 receives a placement request from the CM backend 112. In this example, the request is for a medium instance type. In response to the request, a medium ranker 314 selects a slot from the medium slot candidate data 308, as indicated at circle '3'. Rankers 312, 314, and 316 apply one or more selection policies to select a slot from the respective slot candidate data 306, 308, 310. Exemplary policies filter and/or score candidate slots (whether potential slots in unslotted capacity or actual slots in pre-slotted capacity) to select a slot to satisfy the request. Exemplary factors using in the ranking process include, but are not limited to, geographic region, workload of other instances on the electronic device, whether the customer has other instances on the electronic device, etc.

Once the ranker has selected a slot, the PS 114 returns an identification of the selected slot to the CM backend 112, as indicated at circle '4A,' In addition, the PS 114 sends an indication that a medium slot has been (or will be) consumed to the CTS 111, as indicated at circle '4B', in some embodiments.

As indicated at circle '4C', the ranker performing the selection sends an update to the candidate builder 302 to indicate to the candidate builder 302 that one of the slots in the candidate data was selected. The candidate builder 302 checks whether the consumed slot was a potential slot. If the consumed slot was in pre-slotted capacity, the candidate builder 302 removes that slot from the respective candidate data. If the consumed slot was a potential slot, the consumption of the slot will affect the unslotted capacity of the associated device and therefore the other potential slots still reflected in the candidate data. Thus, the candidate builder 302 updates any potential slots that can no longer be supported by the updated unused capacity of the unslotted electronic device. To avoid rankers selecting a potential slot that may no longer fit on an instance, the candidate builder 302 prohibits selection of other slots associated with the same electronic device until it can update the candidate data. For example, the candidate builder 302 can impose a lock (e.g., set a flag) in the candidate data associated with the potential slots of the electronic device that, when set, indicates to the rankers that the slot is unavailable. The candidate builder 302 can then determine an updated set of potential slots that can be hosted by the unslotted electronic device, remove any potential slots that are no longer supported, and remove the lock on those potential slots that remain supported.

Although not shown, the PS 114 also performs operations in response to instance terminations. For example, the CM backend 112 can send a message to the PS 114 that indicates an instance was terminated. If the instance was hosted on a pre-slotted electronic device, the candidate builder 302 can update the respective candidate data to include the slot. If the instance was hosted on an unslotted electronic device, the candidate builder 302 can determine an updated set of potential slots that can be hosted by the unslotted electronic device and add any newly-supported potential slots that arose after the termination of the instance. Note that the PS 114 does not need to impose a lock or other form of prohibition of selection of potential slots in response to a termination since the existing potential slots associated with the electronic device remain supported (e.g., the unslotted capacity resource vector is getting larger rather than smaller).

Figure 4:
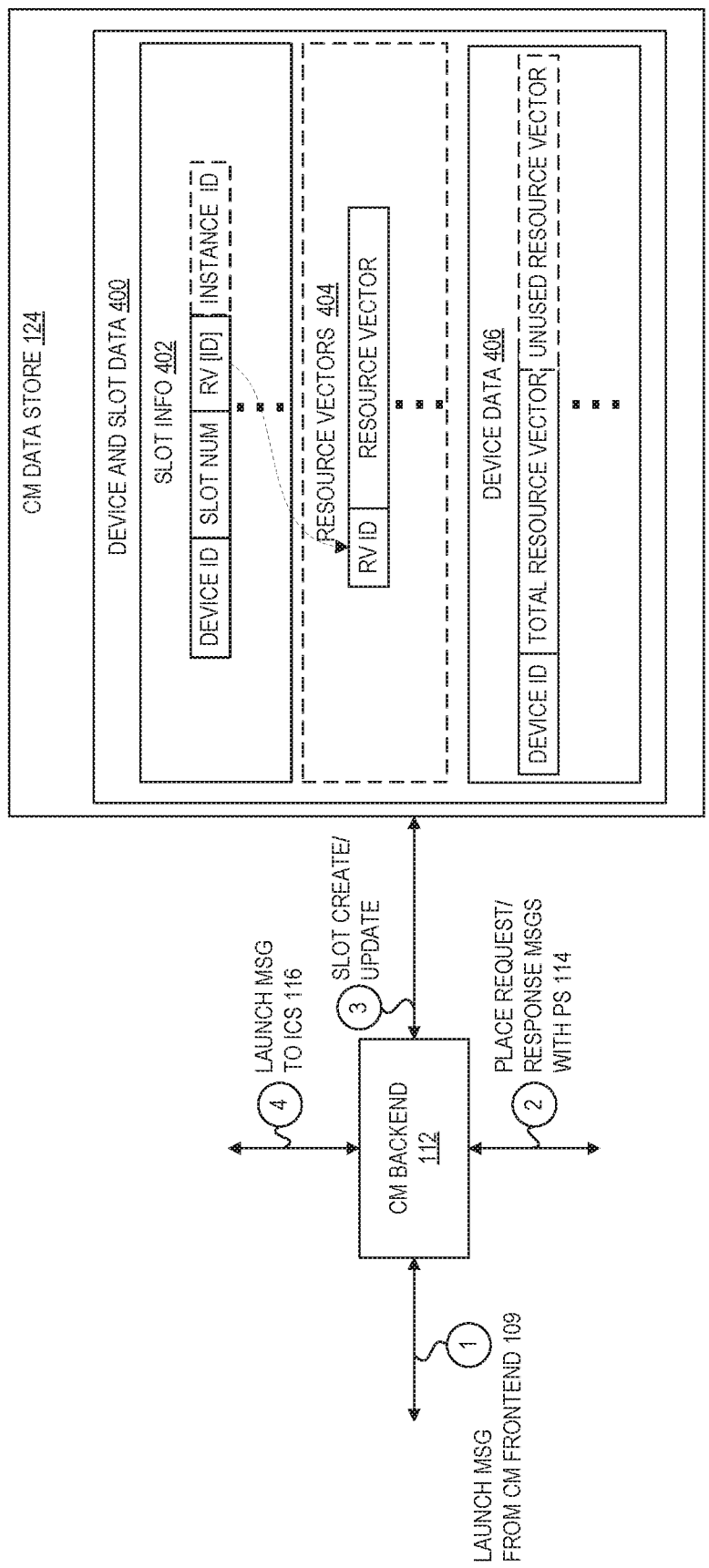
FIG. 4 is a diagram illustrating exemplary operations and messaging involving a cloud manager backend service and exemplary data that can be used as part of on demand capacity management in a provider network according to some embodiments.

FIG. 4 is a diagram illustrating exemplary operations and messaging involving a cloud manager backend service and exemplary data that can be used as part of on demand capacity management in a provider network according to some embodiments. The right side of FIG. 4 illustrates exemplary data that can be used as part of on demand capacity management in a provider network. In some embodiments, the CM data store 124 comprises a database that can be accessed—directly or indirectly—via one or more control plane entities. The CM data store 124 can include device and slot data 400, which can include one or more of a collection (or table) of slot info 402, resource vectors 404, and device data 406.

In some embodiments, each entry (or row, record, etc.) of the slot info 402 includes an electronic device identifier (that uniquely identifies a particular host electronic device within the provider network), and a slot number that is unique within the context of that electronic device. For example, electronic device 202 of FIG. 2 may have slot identifiers 0-7 to reflect each of its eight small slots (regardless of whether they are used), while electronic device 152 of FIG. 1 may have slot identifiers 0-4 to reflect each of the occupied five slots. Entries in slot info 402 may further include a resource vector or a resource vector identifier to directly or indirectly identify the resources used by the slot (e.g., how much compute, memory, network, storage, or other capacity is allocated to that slot). Resource vector identifiers can be used to indirectly identify a resource vector in resource vectors 404, such as a resource vector that defines a particular instance type. In the case of occupied slots, each entry in slot info 402 may further include an instance identifier that uniquely identifies the instance occupying the slot. Note that in the case of pre-slotted instances, the instance identifier may be encoded to indicate no instance is instantiated within the slot or a separate record in the entry may indicate whether the slot is occupied.

In some embodiments, each entry (or row, record, etc.) of the device data 406 includes a device identifier that uniquely identifies unslotted instance-hosting electronic devices. Each entry further includes a total resource vector that represents the total capacity of the device, and, optionally, an unused resource vector that represents the unslotted capacity of the device (e.g., the total resource vector minus the resource vectors of each slot on that electronic device). The CM backend 112 can update the unused resource vector as new slots are created within the unslotted capacity of an electronic device.

Thus, in various embodiments this device and slot data 400 can be used to determine useful information for the operations described herein. For example, in some embodiments, the PS 114 can determine potential candidate slots by fetching the unused resource vector in the device data 406 or subtracting the resource vectors associated with the device in the slot info 402 from the total capacity vector. As another example, the PS 114 can determine pre-slotted candidates by fetching the slot numbers from the slot info 402 associated with an electronic device where the instance identifier or some other flag indicates no instance is occupying the slot.

An exemplary set of events and operations associated with the CM backend 112 is described with reference to the encircled numbers '1' through '4' of FIG. 4. At circle '1', the CM backend 112 receives one or more messages from the CM frontend 109 related to the launch of a requested instance. Such messages may include information about the sizing or requirements of the requested instance (e.g., a resource vector, parameters characterizing compute, network, memory, and other parameters). At circle '2', the CM backend 112 sends one or more messages to the PS 114 to request placement information for the requested instance. Upon receipt of placement information that includes slot information, the CM backend 112 determines whether the slot exists by checking the CM data store 124, as indicated at circle '3'. If the received slot exists, the CM backend 112 sends one or more messages to the ICS 116 to launch the instance, indicated at circle '4'. If the received slot does not exist, the CM backend 112 creates an entry in the slot info 402 before sending one or more messages to the ICS 116 to launch the instance.

For example, the PS 114 may return placement information identifying slot 0 of electronic device 202 in FIG. 2. Since slot 0 exists and is unoccupied, the CM backend 112 updates the existing entry in the slot info 402 with an identifier of the launched instance. As another example, the PS 114 may return placement information identifying slot 6 of electronic device 152 of FIG. 1. Since electronic device 152 is an unslotted electronic device, the slot info 402 does not include an entry for the slot. As a result, the CM backend 112 creates an entry for the slot and updates it with an identifier of the launched instance. The CM backend 112 may further update the unused resource vector in the device data 406, in some embodiments.

In the case of instance termination, the CM backend can check whether the device identifier in the entry in the slot info 402 also appears in the device data 406, indicating the electronic device is part of unslotted capacity. If so, the CM backend 112 can delete the entry in the slot info 402 and, optionally, update the unused resource vector in the device data 406. If not, the CM backend 112 can update the entry in the slot info 402 to indicate the slot that was hosting the terminated instance is no longer occupied.

Figure 5:
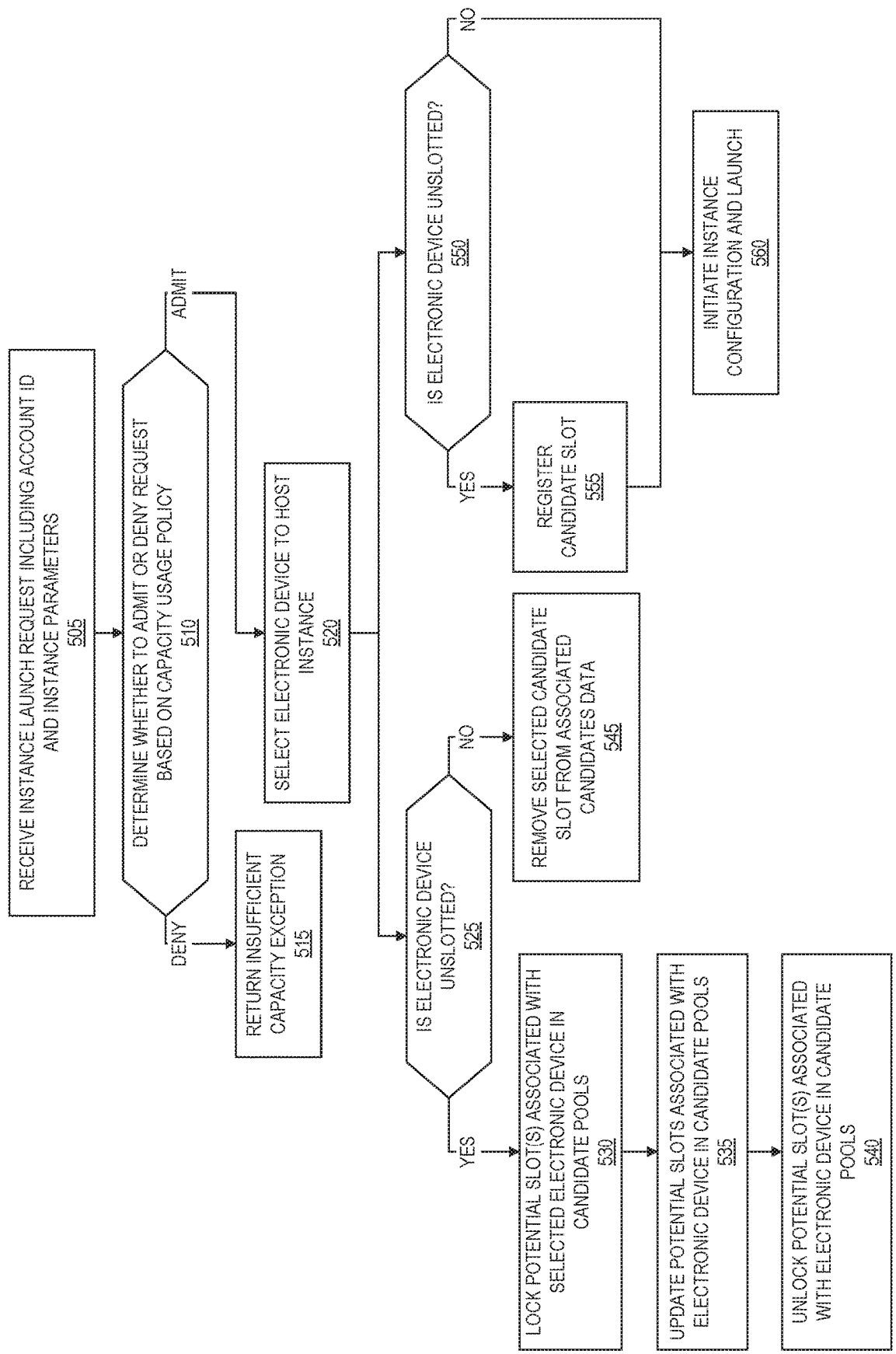
FIG. 5 is a flow diagram illustrating operations of a method for on demand capacity management according to some embodiments.

FIG. 5 is a flow diagram illustrating operations of a method for on demand capacity management according to some embodiments. Some or all of the operations (or other processes described herein, or variations, and/or combinations thereof) of the method are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of the method are performed by control plane 103 of the other figures.

The operations include, at block 505, receiving a request to launch an instance, the request identifying an account and one or more instance parameters. For example and with reference to FIG. 1, a customer (e.g., user 102) of the provider network can cause the electronic device 104 to send a request to launch an instance of a particular type or having a particular configuration to the provider network 100. In addition to performing operations such as verifying the identity of the requestor, the interface(s) 108 receive the request and initiate operations along a launch path of the provider network that handles allocating some portion of the fleet 101 for the customer's request launching the requested instance within that allocated portion. In some embodiments, the fleet 101 can be logically partitioned into slots, where each electronic device can host instance of one or more different types. Some electronic devices host only a single instance type or family of instance types, while other electronic devices host many different instance types or families of instance types.

The operations further include, at block 510, determining whether to admit or deny the request based on a capacity usage policy. As explained above with reference to FIG. 1, the PES 110 evaluates the request to determine whether to permit the launch. The PES 110 can apply the capacity usage policy to one or more aspects of the launch request such as whether the request is to launch a large number of instances that would potentially deplete a pool. As explained, the presence of unslotted electronic devices can artificially inflate the capacity of individual pools associated with particular instances since the unslotted capacity may be represented as contributing to many different capacity pools. Since pool capacities may no longer be independently maintained and managed, the CTS 111 advertises a pool capacity that reflects unslotted capacity (and, if present, pre-slotted capacity) and a safety stock watermark that is set to prevent the depletion of one pool when permitting launches in another pool. Based on the policy application, the PES 110 either admits or denies the request. The operations in the latter case further include, at block 515, returning an insufficient capacity exception. The insufficient capacity exception may be reported back through to the customer issuing the request (e.g., from the PES 110, through the CM frontend 109 and interface(s) 108 to the user 102) to indicate the reason why the request failed and/or to an operator of the provider network to prompt reconfiguration or upgrades to the fleet of instance-hosting electronic devices.

If the request is admitted at block 510, the operations further include, at block 520, selecting an electronic device to host the requested instance. As explained above with reference to FIG. 3, the PS 114 can select where within a fleet of instance-hosting electronic devices to host the requested instance. As explained above, the control plane 103 may logically divide physical computer systems into slots in some embodiments. The PS 114 can generate a list of candidate slots for various instance types, where some of the slots exist as part of pre-slotted instance-hosting electronic devices while other slots are "potential" slots created by the PS 114 based on unused capacity of unslotted instance-hosting electronic devices. In response to receiving a placement request from the CM backend 112, a ranker application of the PS 114 can evaluate the potential slot candidates that would satisfy the placement request and select one of the slots (and associated electronic device) to host the requested instance.

As illustrated, the operations further include at blocks 525 and 550, determining whether the selected electronic device is unslotted. Note that blocks 525 and 550 are illustrated in parallel as under the exemplary control plane architecture illustrated in FIG. 1, the operations including and following block 525 may be performed by the PS 114 while the operations including and following block 550 may be performed by the CM backend 112.

With reference to block 525, the PS 114 determines whether the selected electronic device is unslotted. For example, the PS 114 can check whether the selected slot exists in the CM data store 124 (or a read replica thereof), provided the CM backend 112 has not already created the slot. As another example, the PS 114 can check whether the selected slot was a potential slot with the aid of a flag in the candidate data from which the electronic device and slot were selected.

If the selected electronic device is unslotted, the operations further include, at block 530, locking any potential slots associated with the selected electronic device. As explained above, since some portion of the unslotted capacity of the electronic device is being consumed, the remaining unslotted capacity may no longer support certain instance pools. For example, if the electronic device 154B of FIG. 1 is selected to host another small instance, the remaining unslotted capacity could no longer support a large instance.

To prevent selection of the electronic device while the pools supported by the unslotted electronic device are being updated (e.g., updates to slot candidate data 306, 308, 310), the PS 114 can impose a lock to prohibit selection of the unslotted electronic device in response to future placement requests. An exemplary locking mechanism could include a flag in the candidate data that indicates whether a given candidate can be selected.

The operations further include, at block 535, updating the potential slots associated with the electronic device in the candidate slot data. As described above, the unused capacity associated with an unslotted electronic device can be represented in different instance type pools (e.g., slot candidate data 306, 308, 310). When a potential slot is selected, the PS 114 recalculates which instance types are supported by the unused capacity after it is reduced by the amount of resources consumed by the selected potential slot. Taking electronic device 210 of FIG. 2 after launch of a large instance as an example, the PS 114 may initially determine the unused capacity can support one large, two medium, or four small instances, representing at least one of each type in the respective slot candidate data 306, 308, 310. If the PS 114 selects electronic device 210 to in response to a request to place a small instance, the remaining capacity after selection can no longer support a large instance type. As a result, the PS 114 removes the potential slot from the large slot candidate data 310.

The operations further include, at block 540, unlocking any potential slots that remain supported by the electronic device. As explained above with reference to FIG. 3, at this stage the PS 114 can again make the potential slots derived from the remaining unused capacity of an unslotted electronic device available for selection by the rankers.

If the selected electronic device is not unslotted (e.g., is pre-slotted), the operations further include, at block 545, removing the selected slot from the slot candidate data or pool in which the selected slot was represented. Under this scenario, the selected slot was an actual slot as part of an instance-hosting electronic device configured for that slot type. The selection of that slot removes it from the slot candidates. For example, if the PS 114 selected one of the eight small slots of electronic device 202 in FIG. 2, the PS 114 would remove the selected slot from the small slot candidate data 306. The remaining slots remain available for selection by the rankers.

Returning to block 550, the CM backend 112 determines whether the selected electronic device is unslotted. For example, the CM backend 112 can check whether the combination of the electronic device and slot received from the PS 114 exists in the CM data store 124.

If the selected electronic device is not unslotted (e.g., is pre-slotted), the operations further include, at block 560, those described below. If the selected electronic device is unslotted, the operations further include, at block 555, registering the slot in the CM data store 124. For example, the CM backend 112 can create a new entry in the slot info 402 that references the new slot on the electronic device (e.g., converting the "potential" slot from the PS 114 into an actual slot until the resident instance is terminated and CM backend 112 deletes the entry).

The operations further include, at block 560, initiating the configuration and launch of the instance. In the embodiment illustrated in FIG. 1, the CM backend 112 sends one or more messages to the ICS 116 which in turn communicates with a hypervisor, virtual machine manager, or other agent that manages the creation of instances on the selected electronic device. The ICS 116 can thus cause the creation of the instance with the customer- or type-specified performance (e.g., number of processor cores, amount of memory, attached network interfaces, accelerators, and/or local disks, etc.) and associated operating environment (e.g., an operating system, embedded application, etc.)

Figure 6:
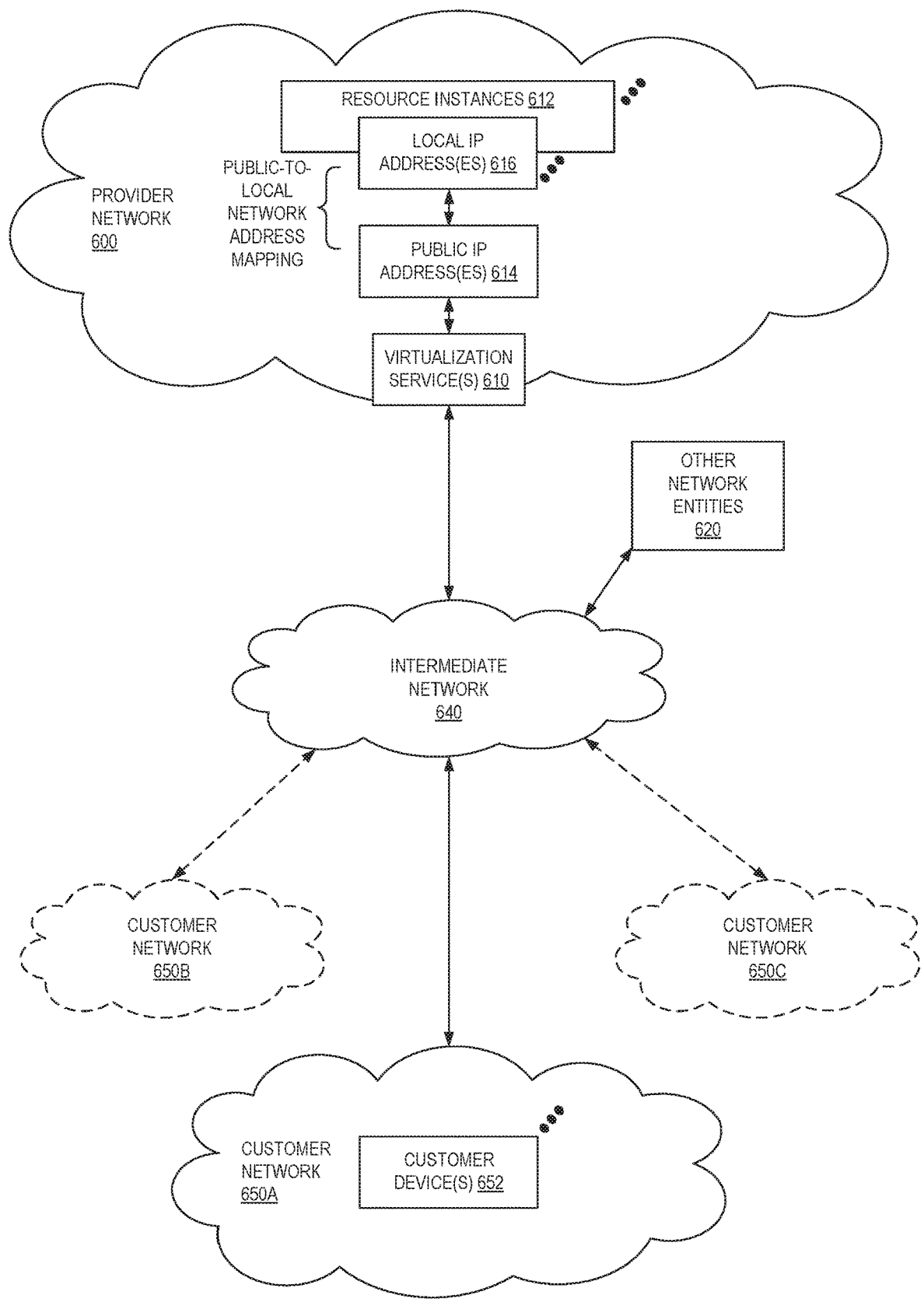
FIG. 6 is a diagram illustrating an exemplary provider network environment according to some embodiments.

FIG. 6 is a diagram illustrating an exemplary provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
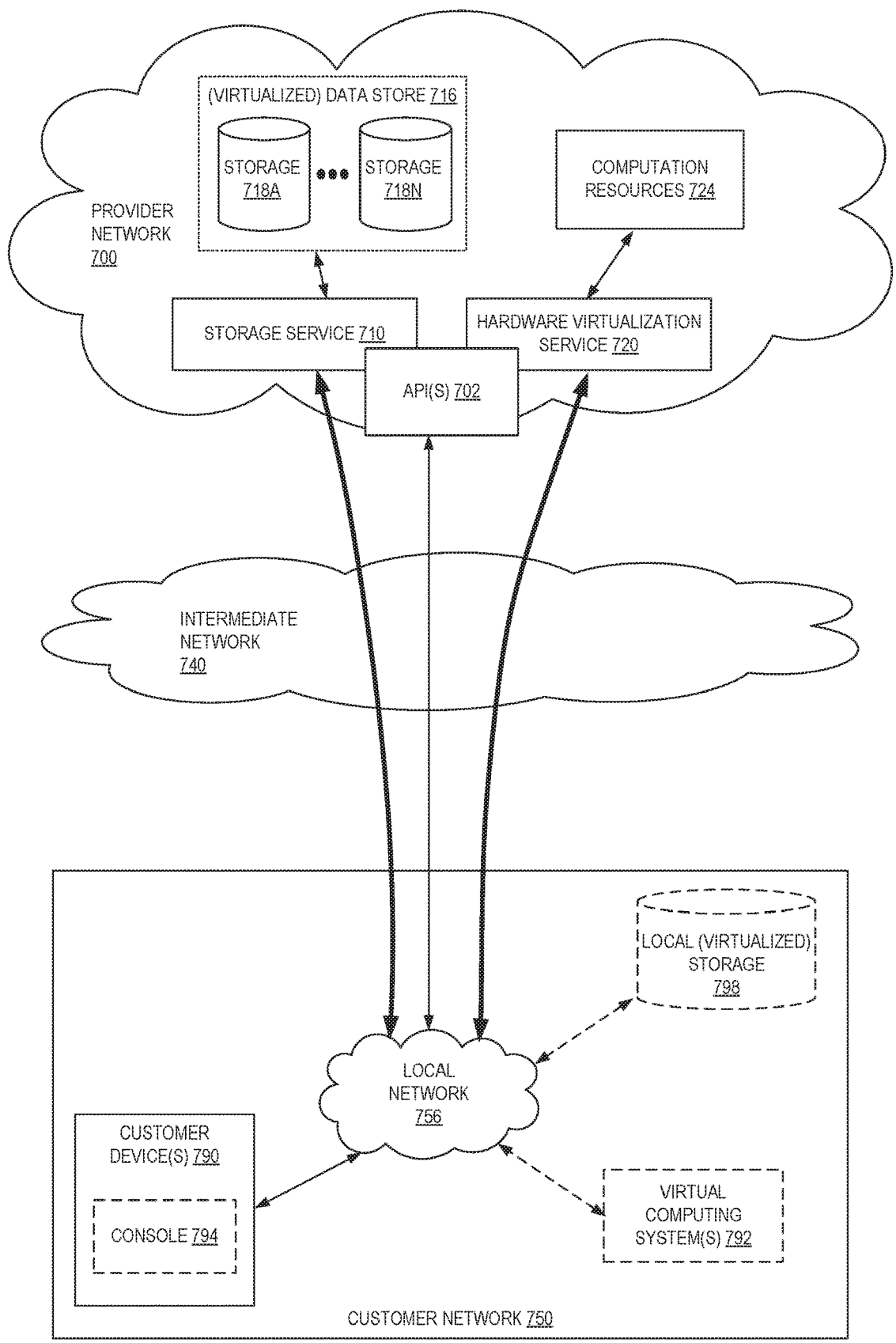
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
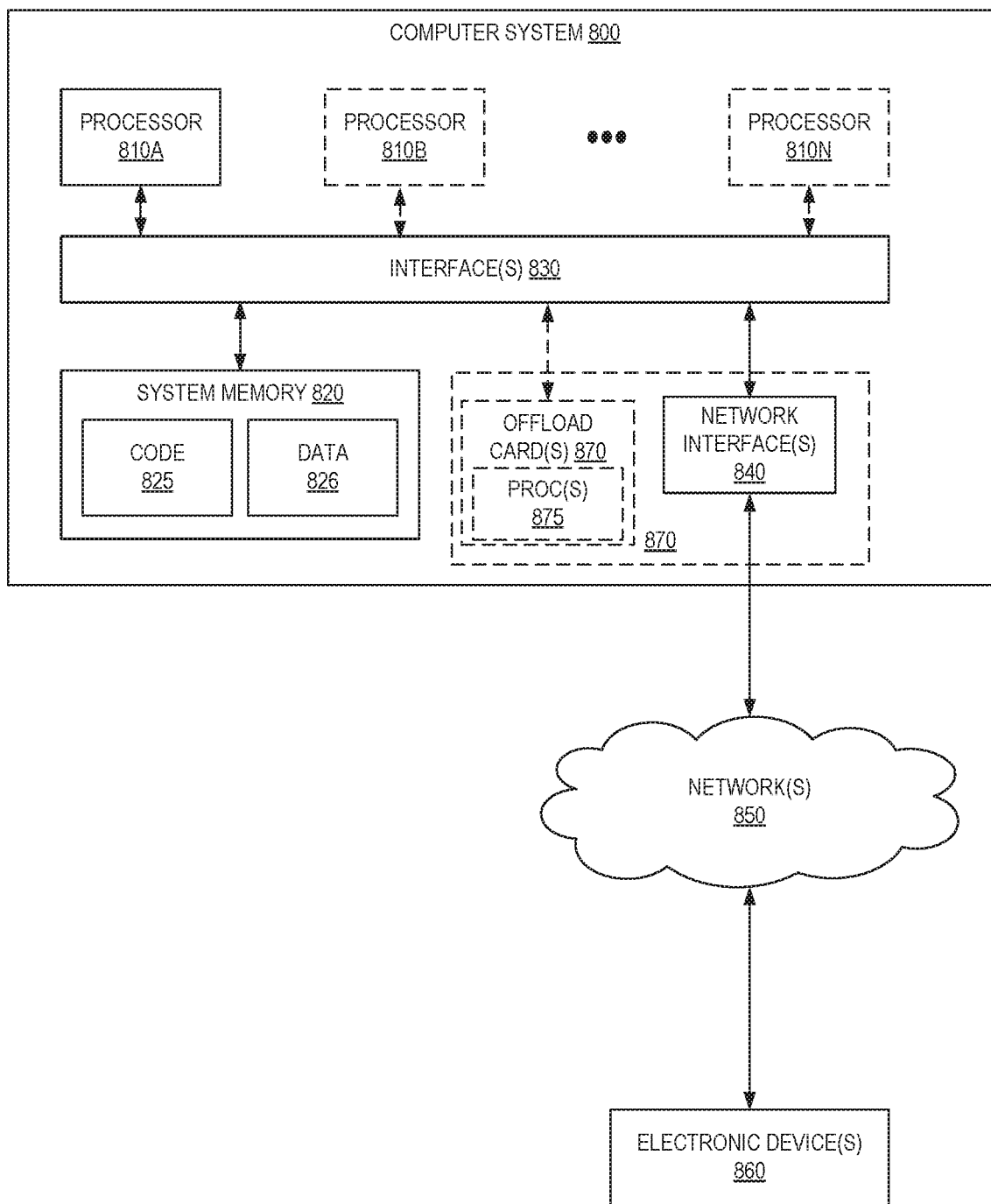
FIG. 8 is a block diagram illustrating an example computer system that may be used in some embodiments.

In some embodiments, a system that implements a portion or all of the techniques for on demand capacity management as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a control plane service of a provider network implemented by one or more electronic devices, a request to launch a virtual machine of a first virtual machine type in a provider network that has a plurality of electronic devices that host virtual machines;
   selecting, by the control plane service, a first slot for the virtual machine from a first set of candidate slots of the first virtual machine type, the first set of candidate slots including potential slots that are not pre-allocated to the first virtual machine type and actual slots that are pre-allocated to the first virtual machine type, wherein the first slot represents a first portion of an unused compute capacity of an electronic device of the plurality of electronic devices;
   determining, by the control plane service, that the first slot is a potential slot;
   causing, by the control plane service, execution of the virtual machine at the first slot of the electronic device;
   removing, by the control plane service, the first slot from the first set of candidate slots stored in a candidate data store; and removing, by the control plane service, a second slot from a second set of candidate slots of a second virtual machine type stored in the candidate data store based on the selection of the first slot for the virtual machine and the first slot being a potential slot.

2. The computer-implemented method of claim 1, wherein the second slot represents a second portion of the unused compute capacity of the same electronic device prior to selecting the first slot and a total of the first portion of the unused compute capacity and the second portion of the unused compute capacity exceed the unused compute capacity of the electronic device prior to selecting the first slot.

3. The computer-implemented method of claim 1, further comprising:
 prior to removing the second slot from the second set of candidate slots, preventing, by the control plane service, selection of a plurality of remaining candidate slots associated with the electronic device, wherein the plurality of remaining candidate slots includes slots corresponding to a plurality of different virtual machine types; and
 after removing the second slot from the second set of candidate slots, permitting, by the control plane service, selection of the plurality of candidate slots that remain after removal of one or more slots, including the second slot, from the plurality of slots.

4. A computer-implemented method comprising:
 receiving, at a control plane service of a provider network implemented by one or more electronic devices, a request to launch a virtual machine of a first virtual machine type in the provider network;
 selecting, by the control plane service, a first slot for the virtual machine from a first set of candidate slots of the first virtual machine type, the first set of candidate slots including potential slots that are not pre-allocated to the first virtual machine type and actual slots that are pre-allocated to the first virtual machine type, wherein the first slot represents a first portion of an unused capacity of an electronic device in the provider network;
 determining, by the control plane service, that the first slot is a potential slot;
 causing, by the control plane service, execution of the virtual machine at the first slot of the electronic device; and
 removing, by the control plane service, a second slot from a second set of candidate slots of a second virtual machine type stored in a first data store based on the selecting the first slot for the virtual machine and the first slot being a potential slot.

5. The computer-implemented method of claim 4, wherein the second slot represents a second portion of the unused capacity of the same electronic device prior to selecting the first slot and the second portion includes the first portion.

6. The computer-implemented method of claim 4, further comprising:
 prior to removing the second slot from the second set of candidate slots, preventing, by the control plane service, selection of a plurality of remaining candidate slots associated with the electronic device, wherein the plurality of remaining candidate slots includes slots corresponding to a plurality of different virtual machine types; and
 after removing the second slot from the second set of candidate slots, permitting, by the control plane service, selection of the plurality of candidate slots that remain after removal of one or more slots, including the second slot, from the plurality of slots.

7. The computer-implemented method of claim 4, further comprising:
 identifying one or more virtual machine types supported by the unused capacity of the electronic device; and
 for each of the identified virtual machine types, adding a slot to a set of candidate slots of a virtual machine type that matches the identified virtual machine type.

8. The computer-implemented method of claim 4, further comprising, after selecting the first slot, associating the first slot with the electronic device in a second data store.

9. The computer-implemented method of claim 8, wherein a third slot in the first set of candidate slots is associated with another electronic device in the second data store.

10. The computer-implemented method of claim 8, wherein the unused capacity of the electronic device is a difference between a total capacity of the electronic device and any other slots associated with the electronic device in the second data store.

11. The computer-implemented method of claim 4, further comprising, prior to receiving the request to launch the virtual machine, causing a plurality of indications of virtual machine types supported by the unused capacity of the electronic device to be displayed to a customer, wherein the customer has leased a total capacity of the electronic device.

12. The computer-implemented method of claim 4, wherein the first slot represents an amount of compute and memory resources of the electronic device.

13. A system comprising:
 a plurality of electronic devices in a provider network that host virtual machines; and
 a control plane service of the provider network implemented by a one or more electronic devices, the control plane service including instructions that upon execution cause the control plane service to:
  receive a request to launch a virtual machine of a first virtual machine type;
  select a first slot for the virtual machine from a first set of candidate slots of the first virtual machine type, the first set of candidate slots including potential slots that are not pre-allocated to the first virtual machine type and actual slots that are pre-allocated to the first virtual machine type, wherein the first slot represents a first portion of an unused capacity of an electronic device of the plurality of electronic devices;
  determine, by the control plane, that the first slot is a potential slot;
  cause execution of the virtual machine at the first slot of the electronic device; and
  remove from a first data store a second slot from a second set of candidate slots of a second virtual machine type based on the selection of the first slot for the virtual machine and the first slot being a potential slot.

14. The system of claim 13, wherein the second slot represents a second portion of the unused capacity of the same electronic device prior to selecting the first slot and the second portion includes the first portion.

15. The system of claim 13, the control plane service including further instructions that upon execution cause the control plane service to:
 prior to the removal of the second slot from the second set of candidate slots, prevent selection of a plurality of remaining candidate slots associated with the electronic device, wherein the plurality of remaining candidate slots includes slots corresponding to a plurality of different virtual machine types; and after removal of the second slot from the second set of candidate slots, permit selection of the plurality of candidate slots that remain after removal of one or more slots, including the second slot, from the plurality of slots.

16. The system of claim 13, the control plane service including further instructions that upon execution cause the control plane service to:

identify one or more virtual machine types supported by the unused capacity of the electronic device; and for each of the identified virtual machine types, add a slot to a set of candidate slots of a virtual machine type that matches the identified virtual machine type.

17. The system of claim 13, the control plane service including further instructions that upon execution cause the control plane service to, after selection of the first slot, associate the first slot with the electronic device in a second data store.

18. The system of claim 17, wherein a third slot in the first set of candidate slots is associated with another electronic device in the second data store.

19. The system of claim 17, wherein the unused capacity of the electronic device is a difference between a total capacity of the electronic device and any other slots associated with the electronic device in the second data store.

20. The system of claim 13, the control plane service including further instructions that upon execution cause the control plane service to, prior to receipt of the request launch the virtual machine, cause a plurality of indications of virtual machine types supported by the unused capacity of the electronic device to be displayed to a customer, wherein the customer has leased a total capacity of the electronic device.

* * * * *